United States Patent
Moriyasu

(10) Patent No.: US 12,524,079 B2
(45) Date of Patent: Jan. 13, 2026

(54) CONTROL APPARATUS AND CONTROL METHOD

(71) Applicant: Panasonic Automotive Systems Co., Ltd., Kanagawa (JP)

(72) Inventor: Takayoshi Moriyasu, Kanagawa (JP)

(73) Assignee: PANASONIC AUTOMOTIVE SYSTEMS CO., LTD., Kanagawa (JP)

( * ) Notice: Subject to any disclaimer, the term of this patent is extended or adjusted under 35 U.S.C. 154(b) by 0 days.

(21) Appl. No.: 18/883,358

(22) Filed: Sep. 12, 2024

(65) Prior Publication Data

US 2025/0013311 A1     Jan. 9, 2025

Related U.S. Application Data

(63) Continuation of application No. PCT/JP2022/039533, filed on Oct. 24, 2022.

(30) Foreign Application Priority Data

Mar. 16, 2022   (JP) ................. 2022-041251

(51) Int. Cl.
*G06F 3/01* (2006.01)
*G06T 3/40* (2006.01)
(Continued)

(52) U.S. Cl.
CPC ............. *G06F 3/017* (2013.01); *G06F 3/011* (2013.01); *G06T 3/40* (2013.01); *G06T 3/60* (2013.01);
(Continued)

(58) Field of Classification Search
CPC . G06F 3/01; G06F 3/011; G06F 3/012; G06F 3/013; G06F 3/017; G06F 3/0304;
(Continued)

(56) References Cited

U.S. PATENT DOCUMENTS 12,170,822 B2 * 12/2024 Qin .................. G06F 3/013
2007/0257891 A1 * 11/2007 Esenther ............. G06F 3/04883
345/173

(Continued)

FOREIGN PATENT DOCUMENTS

JP     2020-149228     9/2020

OTHER PUBLICATIONS

International Search Report Issued in International Patent Application No. PCT/JP2022/039533, dated Dec. 13, 2022, along with an English language translation thereof.

*Primary Examiner* — Richard J Hong
(74) *Attorney, Agent, or Firm* — Greenblum & Bernstein, P.L.C.

(57) ABSTRACT

In a control apparatus, a reference point setting unit receives spatial coordinates of each of a first part, a second part, and a third part of a body of a user located in front of a display, identifies a midpoint between the spatial coordinates of the first part and the spatial coordinates of the second part, and sets a point on the display intersecting a virtual straight line passing through the midpoint identified and the spatial coordinates of the third part as a reference point. A function execution unit performs a process, determined by a movement of the first part and the second part, on an image displayed on the display, with reference to the reference point set.

17 Claims, 9 Drawing Sheets

(51) Int. Cl.
  *G06T 3/60* (2006.01)
  *G06V 40/20* (2022.01)
(52) U.S. Cl.
  CPC .......... *G06V 40/28* (2022.01); *G06V 2201/07* (2022.01)
(58) Field of Classification Search
  CPC .............. G06F 3/0346; G06F 3/04845; G06F 3/04815; G06F 3/04883; G06T 3/40; G06T 3/60; G06V 2201/07; G06V 40/28; G06V 40/20; H04N 21/42204
  See application file for complete search history.

(56) References Cited

U.S. PATENT DOCUMENTS

| | | | | |
|---|---|---|---|---|
| 2011/0267265 | A1* | 11/2011 | Stinson | G06F 3/017 345/157 |
| 2012/0206333 | A1* | 8/2012 | Kim | H04N 21/42204 345/156 |
| 2013/0321347 | A1 | 12/2013 | Kim | |
| 2015/0205362 | A1* | 7/2015 | Park | G06F 3/04815 345/156 |
| 2019/0369741 | A1* | 12/2019 | Chen | G06V 40/20 |

\* cited by examiner

CONTROL APPARATUS AND CONTROL METHOD

CROSS-REFERENCE TO RELATED APPLICATIONS

This application is a Continuation of International Application No. PCT/JP2022/039533, filed on Oct. 24, 2022, which in turn claims the benefit of Japanese Application No. 2022-041251, filed on Mar. 16, 2022, the disclosures of which Applications are incorporated by reference herein.

BACKGROUND

1. Field

The present disclosure relates to control apparatuses and control methods.

2. Description of the Related Art

A virtual touch apparatus for remotely controlling electronic equipment having a display surface is known (see, for example, Patent Literature 1).

[Patent Literature 1] US2013/0321347

We have recognized that, in the technology to detect that a user in front of a display has moved two fingertips in the air and to enlarge, reduce, rotate, etc. an image in accordance with the detected movement, the user may experience a feeling of strangeness if enlargement, etc. is made around a position not intended by the user.

SUMMARY

A general purpose of the present disclosure is to provide a technology to process an image in accordance with the movement of a part of a user's body that is not likely to provide a user with a feeling of strangeness.

A control apparatus according to an embodiment of the present disclosure includes: a reference point setting unit that receives spatial coordinates of each of a first part, a second part, and a third part of a body of a user located in front of a display, identifies a midpoint between the spatial coordinates of the first part and the spatial coordinates of the second part, and sets a point on the display intersecting a virtual straight line passing through the midpoint identified and the spatial coordinates of the third part as a reference point; and a function execution unit that performs a process, determined by a movement of the first part and the second part, on an image displayed on the display, with reference to the reference point set.

Another embodiment of the present disclosure relates to a control method. The method includes: receiving spatial coordinates of each of a first part, a second part, and a third part of a body of a user located in front of a display; identifying a midpoint between the spatial coordinates of the first part and the spatial coordinates of the second part, and setting a point on the display intersecting a virtual straight line passing through the midpoint identified and the spatial coordinates of the third part as a reference point; and performing a process, determined by a movement of the first part and the second part, on an image displayed on the display, with reference to the reference point set.

BRIEF DESCRIPTION OF THE DRAWINGS

Embodiments will now be described, by way of example only, with reference to the accompanying drawings that are meant to be exemplary, not limiting, and wherein like elements are numbered alike in several figures, in which.

DETAILED DESCRIPTION

Figure 1:
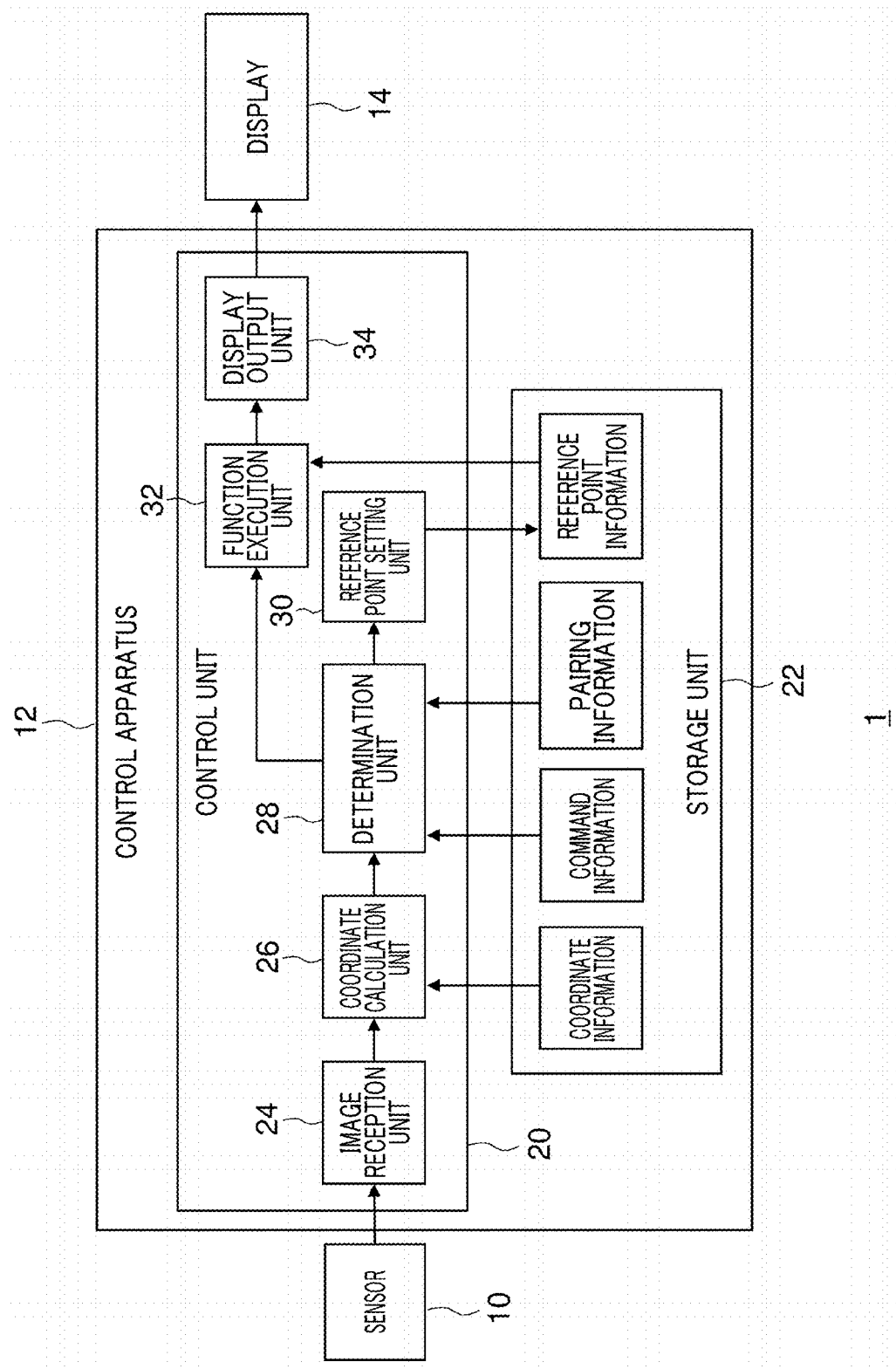
FIG. 1 is a block diagram of a display system of the embodiment.

The invention will now be described by reference to the preferred embodiments. This does not intend to limit the scope of the present invention, but to exemplify the invention.

Hereinafter, identical or like constituting elements, members, steps shown in the drawings are represented by identical symbols, and a duplicate description will be omitted as appropriate. The dimension of the members in the drawings shall be enlarged or reduced as appropriate to facilitate understanding.

Figure 2:
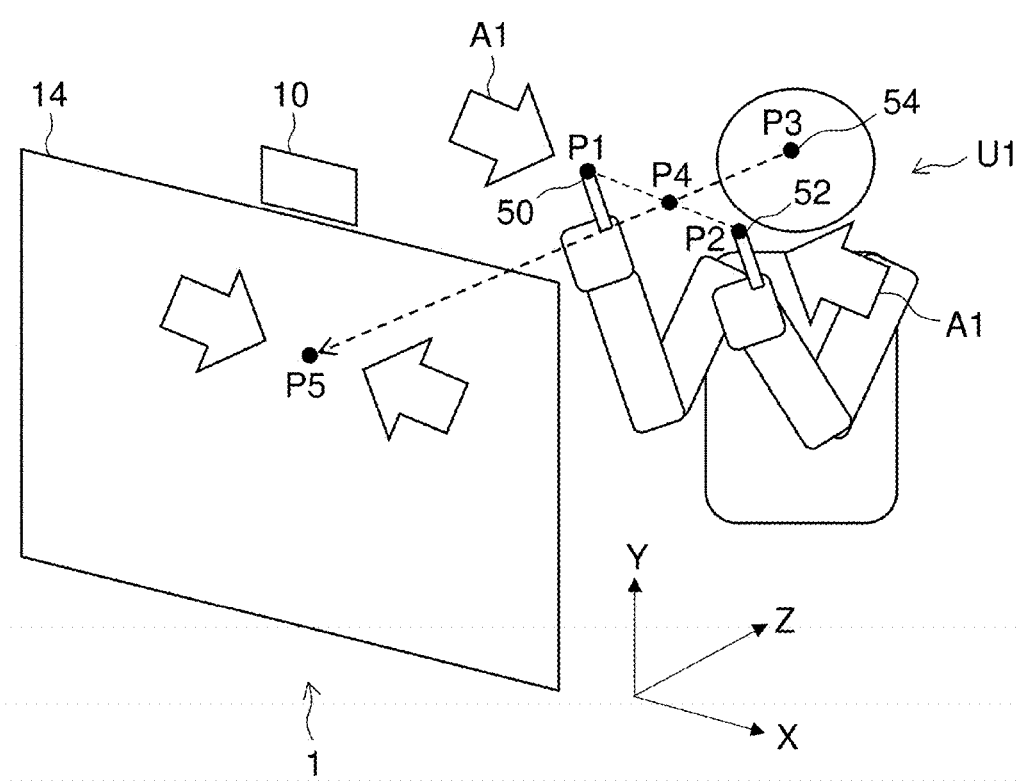
FIG. 2 is a perspective view showing a situation in which a user inputs a user control in the display system of FIG. 1.

FIG. 1 is a block diagram of a display system 1 of the embodiment. FIG. 2 is a perspective view showing a situation in which a user U1 inputs a user control to the display system 1 of FIG. 1. The display system 1 includes a sensor 10, a control apparatus 12, and a display 14. In FIG. 2, illustration of the control apparatus 12 is omitted.

The display system 1 may be installed indoors, etc. or may be mounted on a vehicle such as a car, and the application thereof is not particularly limited. By moving the fingertip in the air without touching the display 14, the user U1 can input a user control corresponding to the movement to the control apparatus 12, and the control apparatus 12 executes a process corresponding to the input user control. The action of the user U1 moving the fingertip in the air can be called an aerial touch action or a gesture action.

The sensor 10 is, for example, a depth camera and is installed at a position where the user U1 located in front of a display surface of the display 14 can be imaged. The sensor 10 periodically images the user U1 and outputs time-series range images thus captured to the control apparatus 12. The frequency of imaging can be appropriately determined by experiments or simulations. For example, images may be captured multiple times per second. The range image includes information on spatial coordinates of each position in the image. These spatial coordinates are coordinates in a three-dimensional Cartesian coordinate system unique to the sensor 10.

The control apparatus 12 recognizes the movement of the fingertip of the user U1 based on time-series range images supplied from the sensor 10, receives a user control input corresponding to the movement of the fingertip, and controls the image displayed on the display 14 according to the user control.

The display 14 displays an image according to the control by the control apparatus 12. The display 14 may have, for example, a screen size of several tens of inches or more for indoor installation or a smaller screen size for in-vehicle use.

There may be one or more users. Examples of user control by two users will be described later. The number of fingertips that can be used for user control input is, for example, one or two per user. Examples of user control using one fingertip will also be described later.

When the user U1 moves a fingertip 50 of the right hand and a fingertip 52 of the left hand in directions of the arrows A1 to perform a pinch-in action of bringing the two fingertips closer as shown in FIG. 2, for example, the control apparatus 12 reduces the image on the screen of the display 14 with a reference point P5 at the center. Denoting a midpoint between a position P1 of the fingertip 50 and a position P2 of the fingertip 52 by P4, the reference point P5 is a point on the screen of the display 14 intersecting a virtual straight line passing through a position P3 of one eye 54 of the user U1 and the midpoint P4. The control apparatus 12 may or may not display an image indicating the reference point P5 on the display 14.

Further, when the user moves the two fingertips in directions opposite to those of the arrows A1 to perform a pinch-out action of moving the two fingertips away, the control apparatus 12 enlarges the image with reference to the reference point P5 on the screen.

In this way, the image can be reduced or enlarged around the viewpoint of the user U1 on the image that results when the line of sight of the user U1 passes through the midpoint P4 between the two fingertips. Accordingly, the user does not experience a feeling of strangeness easily. In a comparative example in which the image is reduced or enlarged around a position on the image far away from the viewpoint of the user U1 that results when the line of sight of the user U1 passes through the midpoint P4, on the other hand, a reduced image or an enlarged image different from the intention of the user U1 may be obtained, and the user U1 may experience a feeling of strangeness.

Figure 3:
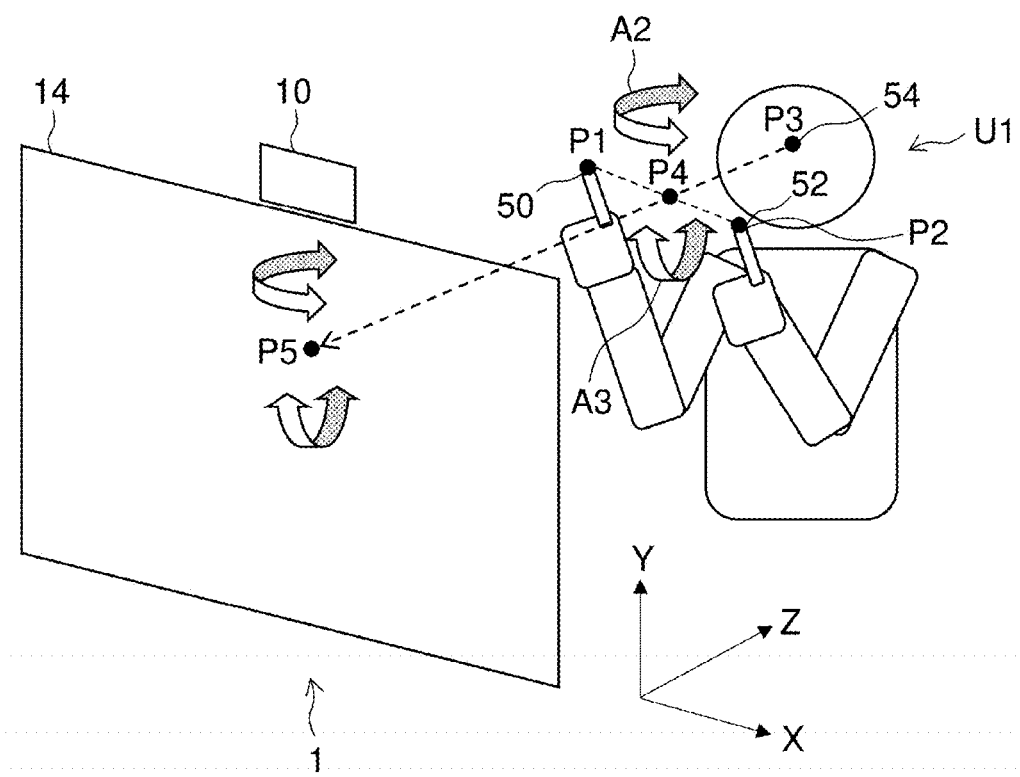
FIG. 3 shows an example in which the user performs a rotating action.

FIG. 3 shows an example in which the user U1 performs a rotating action. FIG. 3 shows the X-axis, Y-axis, and Z-axis of the three-dimensional Cartesian coordinate system of the display system 1. When the user U1 performs a rotating action of rotating the fingertip 50 of the right hand and the fingertip 52 of the left hand around the midpoint P4 in a direction of the arrow A2, i.e., a rotating action of rotating the two fingertips around an axis parallel to the Y axis, the control apparatus 12 rotates the image around an axis on the screen parallel to the Y axis around the reference point P5 on the screen.

Further, when the user U1 performs a rotating action of rotating the fingertip 50 of the right hand and the fingertip 52 of the left hand around the midpoint P4 in a direction of the arrow A3, i.e., a rotating action of rotating the two fingertips around an axis parallel to the X axis, the control apparatus 12 rotates the image around an axis on the screen parallel to the X axis around the reference point P5 on the screen.

When the user U1 performs a rotating action of rotating the two fingertips around an arbitrary virtual axis, the control apparatus 12 rotates the image around an axis on the screen parallel to the virtual axis around the reference point P5 on the screen, although the action is not shown.

Therefore, rotation of the image can be performed around the viewpoint of the user U1 on the image that results when the line of sight of the user U1 passes through the midpoint P4 between the two fingertips.

User control by a pinch-in action, a pinch-out action, and a rotating action using two fingertips of one user is called a multiway user control. A multiway user control may be inclusive of other user controls. The two fingertips used for a multiway user control may be any two fingertips of one hand and, for example, the fingertips of the thumb and the index finger of one hand.

The fingertip 50 and fingertip 52 used for user control are by way of examples, and the first part and the second part of the user's body may be used. The first part and the second part may be parts that can be moved individually to perform a multiway user control and may be, for example, two wrists, two clenched fists, or two palms. The eye 54 is also an example, and a third part of the user's body different from the first part and the second part may be used. The third part may be, for example, a part of the face and may be, the nose, the mouth, the midpoint between the two eyes, or the midpoint between the two ears. The closer the third part to the eye, the closer the reference point P5 to the viewpoint on the image that results when the user's line of sight of the user passes through the midpoint P4 that can be set. In the embodiment, an example in which the first part and second part are two fingertips, and the third part is the eye will be described.

As shown in FIG. 1, the control apparatus 12 includes a control unit 20 and a storage unit 22. The control unit 20 includes an image reception unit 24, a coordinate calculation unit 26, a determination unit 28, a reference point setting unit 30, a function execution unit 32, and a display output unit 34.

The features of the control unit 20 are implemented in hardware such as a CPU, a memory, and other LSIs of any computer and in software such as a program loaded into a memory. The figure depicts functional blocks implemented by the cooperation of these elements. Therefore, it will be obvious to those skilled in the art that the functional blocks may be implemented in a variety of manners by hardware only, by software only, or by a combination of hardware and software. The control apparatus 12 includes, for example, a processor and a memory, and the processor executes a program loaded into the memory, thereby realizing the functions of the control unit 20 and the respective function blocks that the control unit 20 has.

The storage unit 22 stores various information. The storage unit 22 is realized by hardware such as a memory or a storage for storing information (in other words, data). The storage unit 22 holds coordinate information, pairing information, and command information. The coordinate information includes the spatial coordinates of the position of installation of the sensor 10, the angle of mounting the sensor 10, and the spatial coordinates of the position of installation of the display 14. Further, the storage unit 22 stores reference point information. Details of coordinate information, pairing information, command information, and reference point information will be described later.

The image reception unit 24 receives time-series range images from the sensor 10 that captures one or more users located in front of the display 14, and detects the first fingertip, the second fingertip, and the eye of the one or more users by recognizing each range image received. A known image recognition technology can be used to detect fingertips and eyes.

The image reception unit 24 detects one of two eyes located within a predetermined distance in the range image. The predetermined distance is, for example, several cm, and two eyes located within the predetermined distance can be considered as the eyes of the same user. This process corresponds to the image reception unit 24 detecting the eye of each user. When there are a plurality of users in the range image, a plurality of eyes are detected. The number of eyes detected represents the number of users in front of the display 14.

The image reception unit 24 receives the spatial coordinates of the first fingertip, the second fingertip, and the eye thus detected in a time series manner and outputs the spatial coordinates to the coordinate calculation unit 26.

The coordinate calculation unit 26 calculates the spatial coordinates of each of the first fingertip, the second fingertip, and the eye of the user in the three-dimensional Cartesian coordinate system of the display system 1, based on the spatial coordinates of each of the first fingertip, the second fingertip, and the eye of the user in the coordinate system of the sensor 10 supplied from the image reception unit 24, and the spatial coordinates of the position of installation of the sensor 10 and the angle of mounting the sensor 10 included in the coordinate information stored in the storage unit 22. The coordinate calculation unit 26 outputs the calculated spatial coordinates to the determination unit 28.

The determination unit 28 determines the type of user control received for each of the one or more eyes detected, i.e., for each user, based on the spatial coordinates supplied from the coordinate calculation unit 26 and the pairing information stored in the storage unit 22. The determination unit 28 outputs the information thus determined to the function execution unit 32. The pairing information includes the first distance, the second distance, and the predetermined time described below.

When, for each of the one or more eyes detected, the first fingertip and the second fingertip are located within the range of the first distance from the eye, the determination unit 28 instructs the reference point setting unit 30 to set the reference point. The process of setting the reference point will be described later.

When, for each of the one or more eyes detected, the first fingertip and the second fingertip are located within the range of the first distance from the eye, the determination unit 28 determines to receive a multiway user control, provided that a predetermined multiway user control condition is satisfied. Determining to receive a multiway user control is equivalent to pairing the first fingertip with the second fingertip located within the range of the first distance from the eye.

The multiway user control condition requires that the distance between the first fingertip and the second fingertip is equal to or smaller than the second distance, and that the first fingertip and the second fingertip are not stationary for the predetermined time or longer.

The first distance may be, for example, several tens of cm, or in the range of 40 cm-60 cm, or 50 cm. The second distance may be, for example, several tens of cm, or in the range of 40 cm-60 cm, or 50 cm. The first distance and the second distance may be equal or different. The predetermined time may be, for example, several seconds or may be 2 seconds. The first distance, the second distance, and the predetermined time can be appropriately determined by experiments or simulations. The first distance, the second distance, and the predetermined time may be set by the user.

When the first fingertip and the second fingertip are located in the range of the first distance from the eye but the multiway user control condition is not satisfied, or when only one of the first fingertip and the second fingertip is located in the range of the first distance from the eye, for each of the one or more eyes detected, the determination unit 28 determines to receive a single-way user control. A single-way user control is a user control using an on-screen user control point corresponding to each of one or two fingertips, a specific example of which will be described below. When only one of the first fingertip and the second fingertip is located within the range of the first distance from the eye, the determination unit 28 receives a single-way user control effected by the movement of the fingertip located within the range of the first distance from the eye.

When the determination unit 28 determines to receive a multiway user control or a single-way user control, the determination unit 28 determines a process determined by the movement of the first fingertip and the second fingertip, based on the spatial coordinates of the first fingertip, the spatial coordinates of the second fingertip, and the command information stored in the storage unit 22. The command information is information that associates the movement of the first fingertip and the second fingertip with a predetermined process.

When, for each of the one or more eyes detected, the first fingertip and the second fingertip are not located within the range of the first distance from the eye, the determination unit 28 determines not to perform a process. In this case, a situation in which the user's eye is detected, but the user's fingertips are not detected, i.e., a situation in which the user is not putting out a finger and is not trying to perform a gesture action, is assumed.

The reference point setting unit 30 receives, in accordance with the instruction from the determination unit 28, the spatial coordinates of each of the first fingertip, the second fingertip, and the eye from the determination unit 28 for each of the one or more eyes detected, identifies a midpoint between the spatial coordinates of the first fingertip and the spatial coordinates of the second fingertip and sets a point on the display 14 intersecting a virtual straight line passing through the midpoint thus identified and the spatial coordinates of the eye as a reference point.

The reference point setting unit 30 sets the reference point based on the spatial coordinates of the position of installation of the display 14 included in the coordinate information stored in the storage unit 22. The reference point comprises coordinates in the two-dimensional Cartesian coordinate system on the display surface of the display 14.

The reference point setting unit 30 causes the storage unit 22 to store the coordinate information on the reference point thus set as the reference point information. The reference point thus set is maintained until the determination unit 28 switches to, for example, reception of a single-way user control.

When the determination unit 28 determines to receive a multiway user control, the function execution unit 32 performs, for the user providing the user control, a process determined by the movement of the first fingertip and the second fingertip on the image displayed on the display 14 with reference to the reference point set, based on the detail of the process determined by the determination unit 28 and the reference point information stored in the storage unit 22. The function execution unit 32 generates image data processed according to the user control and supplies the image data to the display output unit 34.

As the process determined by the movement of the first fingertip and the second fingertip, the function execution unit 32 performs a process of reducing the image around the reference point in response to a pinch-in action of bringing the first fingertip and the second fingertip closer. The function execution unit 32 reduces the image by a degree determined by the distance of movement of the first fingertip and the second fingertip.

As the process determined by the movement of the first fingertip and the second fingertip, the function execution unit 32 performs a process of enlarging the image around the reference point in response to a pinch-out action of moving the first fingertip and the second fingertip away. The function execution unit 32 enlarges the image by a degree determined by the distance of movement of the first fingertip and the second fingertip.

As the process determined by the movement of the first fingertip and the second fingertip, the function execution unit 32 performs a process of rotating the image around the reference point in response to a rotating action of rotating the first fingertip and the second fingertip around the midpoint. The image rotated may be a target image such as a stereoscopic image in a portion of the screen. The function execution unit 32 rotates the image by an angle determined by the angle of rotation of the virtual straight line connecting the first fingertip and the second fingertip.

When the determination unit 28 determines to receive a single-way user control, the function execution unit 32 performs, for the user providing the user control, a process determined by at least one of the first single-way user control effected by the movement of the first fingertip or the second single-way user control effected by the movement of the second fingertip, based on the detail of the process determined by the determination unit 28.

The function execution unit 32 does not perform the process if, for each of the eyes detected, the first fingertip and the second fingertip are not located within the range of the first distance from the eye.

The display output unit 34 outputs the image data supplied from the function execution unit 32 to the display 14 and causes the display 14 to display the image.

Figure 4:
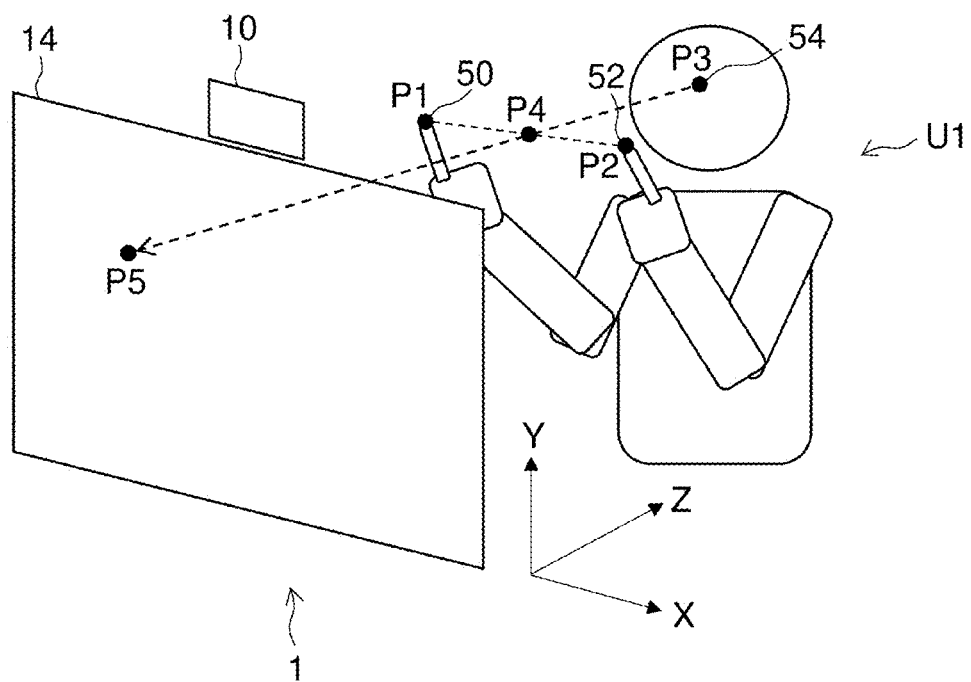
FIG. 4 shows a situation in which the display system of FIG. 1 recognizes the two fingertips of the user.

Examples of various user control will now be described with reference to FIGS. 4 to 7. FIG. 4 shows a situation in which the display system 1 of FIG. 1 recognizes the two fingertips of the user U1. The distance between the two fingertips is assumed to be equal to or smaller than the second distance. The control apparatus 12 sets the reference point P5. In this state, the control apparatus 12 can receive a multiway user control.

Figure 5:
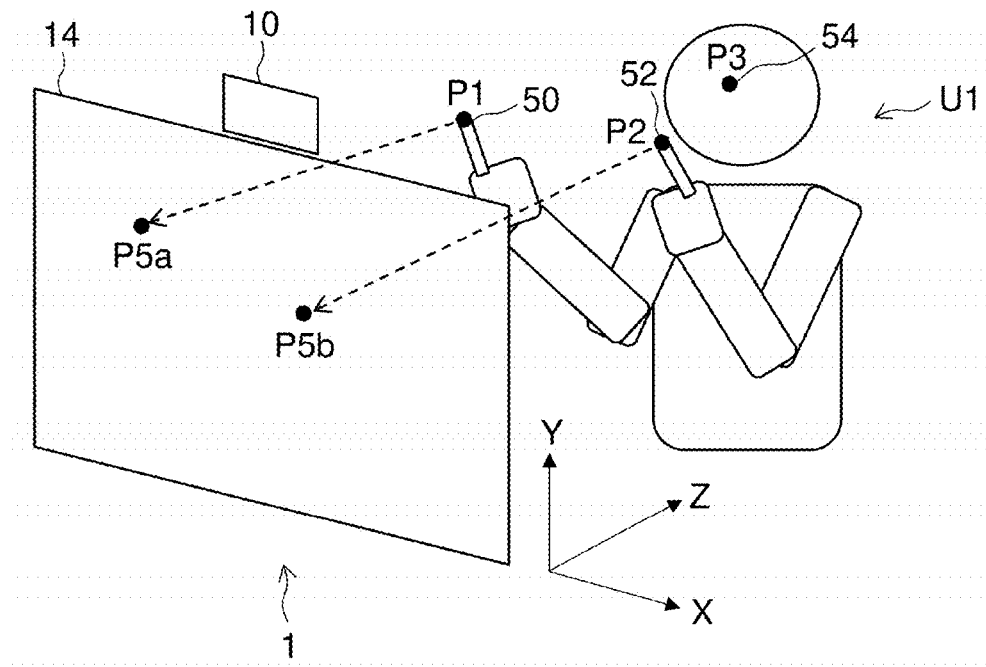
FIG. 5 shows a situation that follows the situation of FIG. 4, in which the user causes the two fingertips to remain stationary for a predetermined time.

FIG. 5 shows a situation that follows the situation of FIG. 4, in which the user U1 causes the two fingertips to remain stationary for a predetermined time. When the two fingertips remain stationary for a predetermined time in the state of FIG. 4, the control apparatus 12 switches to reception of a single-way user control. Therefore, the user U1 can perform a single-way user control using each of a user control point P5a on the screen corresponding to the spatial coordinates of the position P1 of the fingertip 50 and a user control point P5b on the screen corresponding to the spatial coordinates of the position P2 of the fingertip 52.

For example, the control apparatus 12 may set a point on the display 14 intersecting a virtual straight line passing through the position P3 of the eye and the position P1 of the fingertip 50 as the user control point P5a, and set a point on the display 14 intersecting a virtual straight line passing through the position P3 of the eye and the position P2 of the fingertip 52 as the user control point P5b. The control apparatus 12 may or may not cause the display 14 to display an image such as a cursor indicating each of the user control point P5a and the user control point P5b.

The user U1 can move the user control point P5a in the screen by moving the fingertip 50 in the air and move the user control point P5b in the screen by moving the fingertip 52 in the air. The user can perform various publicly known user control different from a multiway user control. For example, the user can move an image of an object, by sandwiching the image of the object displayed on the display 14 between the user control point P5a and the user control point P5b and moving the user control point P5a and the user control point P5b in that state.

When the fingertip 50 and the fingertip 52 are caused to remain stationary again for a predetermined time in the state of FIG. 5, in which a single-way user control is received, control is returned to the state of FIG. 4, and the control apparatus 12 receives a multiway user control. It is therefore convenient because it is easy to switch between a multiway user control and single-way user control in a short time using two fingertips.

Further, the control apparatus 12 may determine to receive a single-way user control also when the distance between the two fingertips shown in FIG. 4 is no longer equal to or smaller than the second distance and the distance between the two fingertips is larger than the second distance. When the distance between the two fingertips is reduced to the second distance or smaller, the control apparatus 12 determines to receive a multiway user control again. It is therefore easy to switch between a multiway user control and a single-way user control in a short time.

Figure 6:
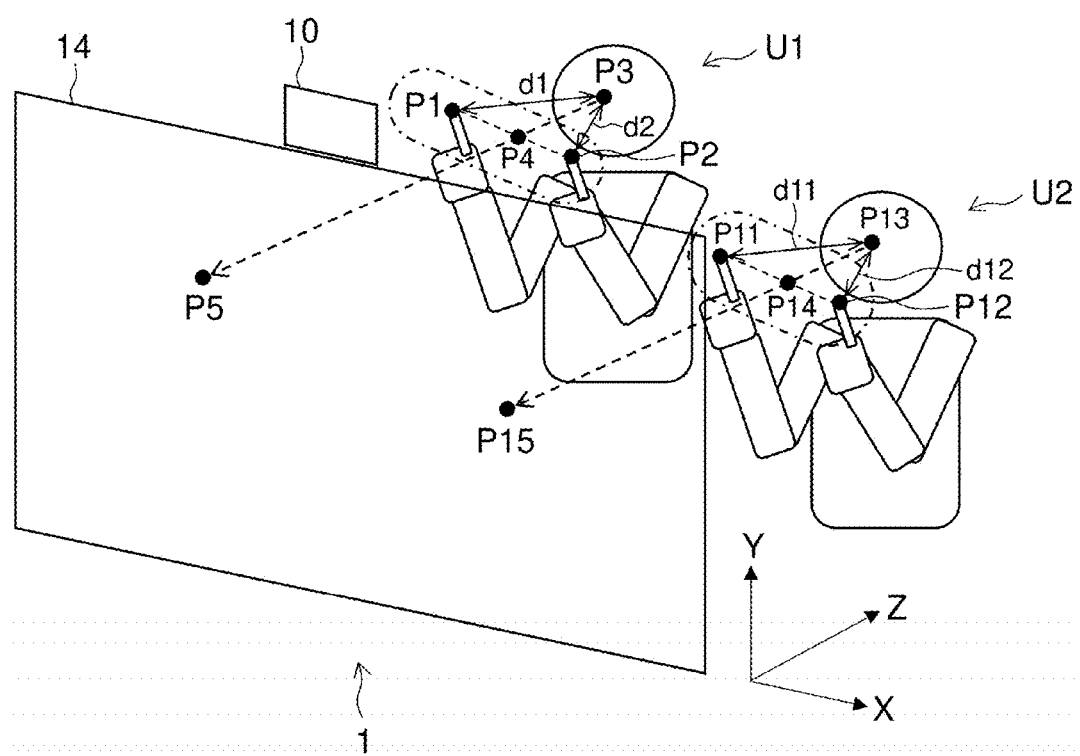
FIG. 6 shows an example in which two users each perform a multiway user control.

A specific example of the process performed in the case of two users will now be described. FIG. 6 shows an example in which two users including a user U1 and a user U2 each perform a multiway user control. A distance d1 between the position P3 of the eye and the position P1 of the fingertip of the user U1, and a distance d2 between the position P3 of the eye and the position P2 of the fingertip of the user U1 are each equal to or smaller than the first distance. The control apparatus 12 pairs two fingertips of the user U1 in the range of the first distance from the position P3 of the eye of the user U1 and receives a multiway user control effected by these fingertips.

A distance d11 between a position P13 of the eye and a position P11 of the fingertip of the user U2, and a distance d12 between a position P13 of the eye and a position P12 of the fingertip of the user U2 are also each equal to or smaller than the first distance. The control apparatus 12 pairs two fingertips of the user U2 in the range of the first distance from the position P13 of the eye of the user U2 and receives a multiway user control effected by these fingertips. The control apparatus 12 identifies, for the user U2, a midpoint P14 between the position P11 of the fingertip and the position P12 of the fingertip and sets a point on the display 14 intersecting a virtual straight line passing through the midpoint P14 and the position P13 of the eye as a reference point P15. The control apparatus 12 performs, for the user U2, a process determined by the movement of the two fingertips on the image, around the reference point P15.

For example, while the display 14 is displaying two screens, the user U1 can perform a multiway user control in one image, and the user U2 can perform a multiway user control in another image. Therefore, it is highly convenient. At least one of the users can perform a multiway user control using two fingertips of one hand.

Figure 7:
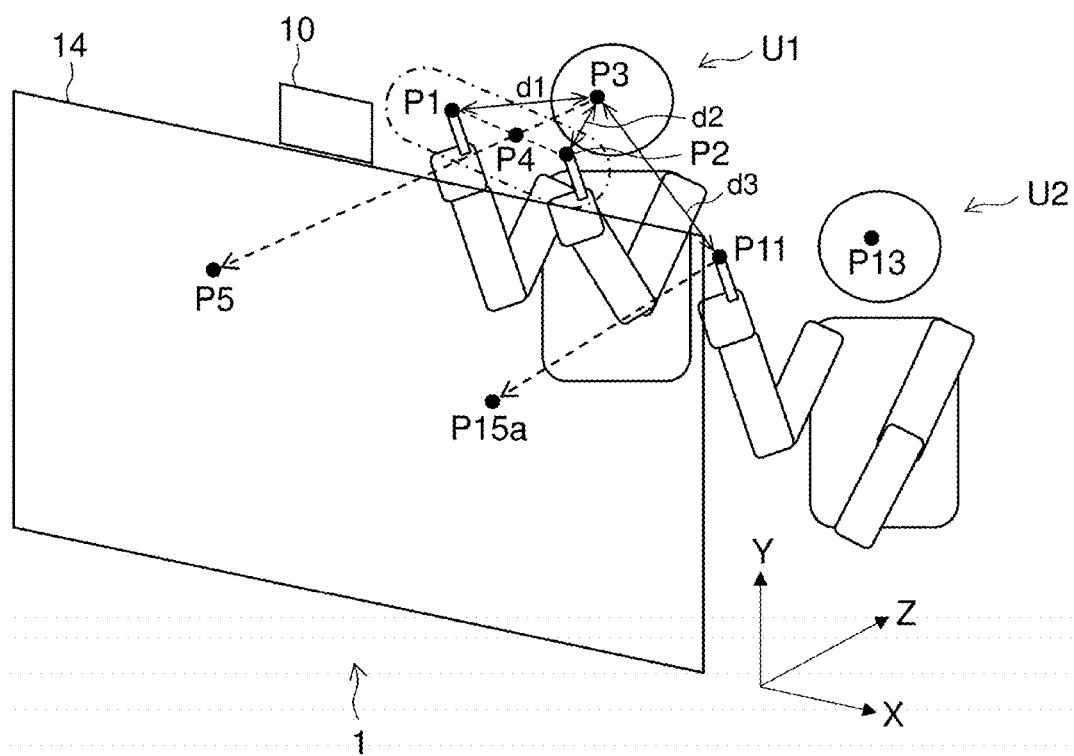
FIG. 7 shows an example in which the user performs a multiway user control and the other user performs a single-way user control.

FIG. 7 shows an example in which the user U1 performs a multiway user control and the other user U2 performs a single-way user control. As in FIG. 6, the control apparatus 12 pairs two fingertips of the user U1 in the range of the first distance from the position P3 of the eye of the user U1 and receives a multiway user control by these fingertips. Since a distance d3 between the position P3 and the position P11 of one fingertip of the right hand of the user U2 is larger than the first distance, the control apparatus 12 does not pair the fingertip at the position P11 with the fingertip at the position P2.

Since there is only one fingertip of the right hand of the user U2 in the range of the first distance from the position P13 of the eye of the user U2, the control apparatus 12 receives a single-way user control using the fingertip. The user U2 can perform a single-way user control using the user control point P15a on the screen corresponding to the spatial coordinates of the position P11 of the fingertip. The user U2 may perform a single-way user control using the fingertip of the left hand instead of the fingertip of the right hand.

When the user U1 raises one finger and the user U2 raises one finger, the control apparatus 12 does not pair these two fingertips and receives a single-way user control of each user, although the action is not shown.

When, for example, one user U2 does not put out a finger, the control apparatus 12 detects the eye of the user U2 but does not perform any process for the user U2, although the action is not shown.

Figure 8:
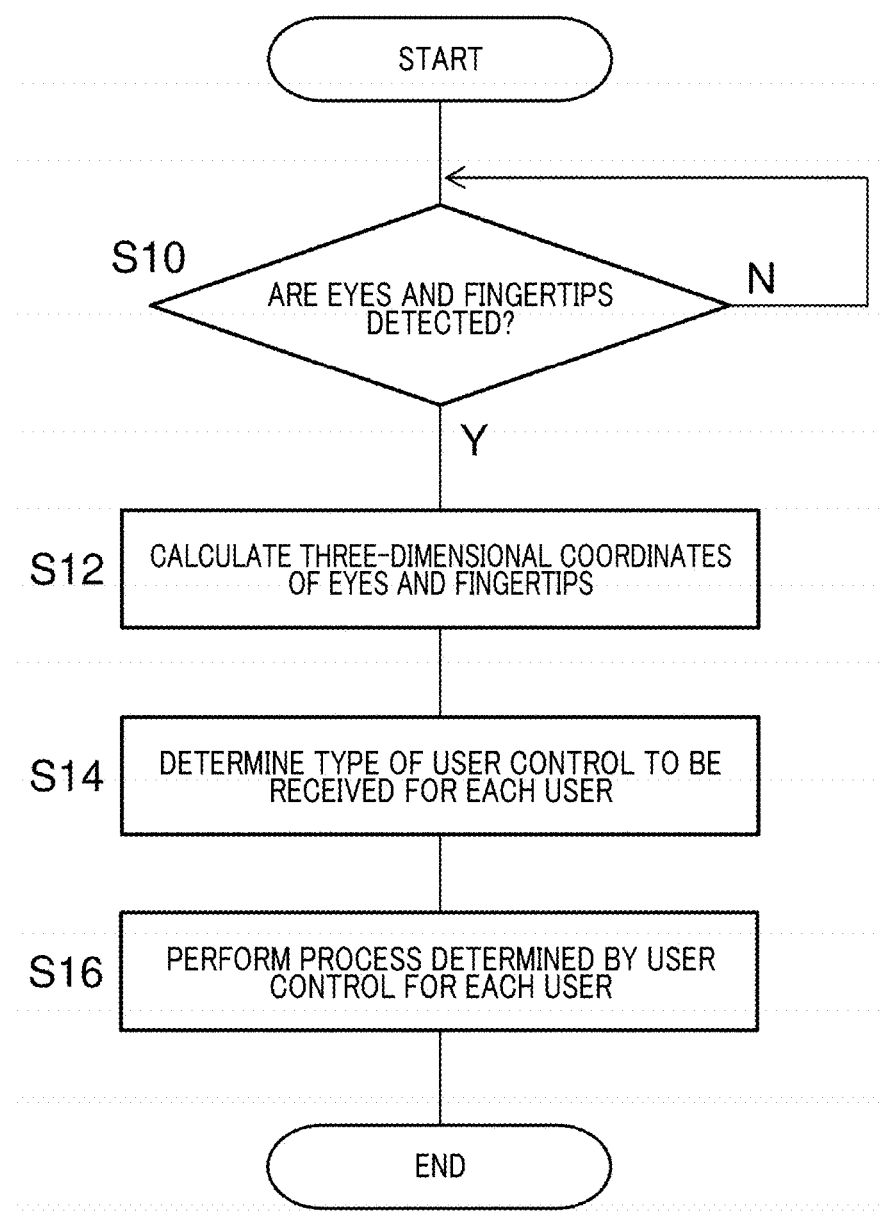
FIG. 8 is a flowchart showing the process of the display system of FIG. 1.

The overall operation of the display system 1 having the above configuration will now be described. FIG. 8 is a flowchart showing the process of the display system 1 of FIG. 1. The image reception unit 24 determines whether the eyes and fingertips are detected (S10), and if they are not detected (N in S10), the process returns to S10. When the eyes and fingertips are detected (Y in S10), the coordinate calculation unit 26 calculates the three-dimensional coordinates of the eyes and fingertips (S12). The determination unit 28 determines the type of user control to be received for each user (S14), and the function execution unit 32 performs a process determined by the user control for each user (S16) and ends the process.

When there are a plurality of users, the function execution unit 32 may perform a process determined by the user control in the order of users for whom the type of user control is determined in S14.

Figure 9:
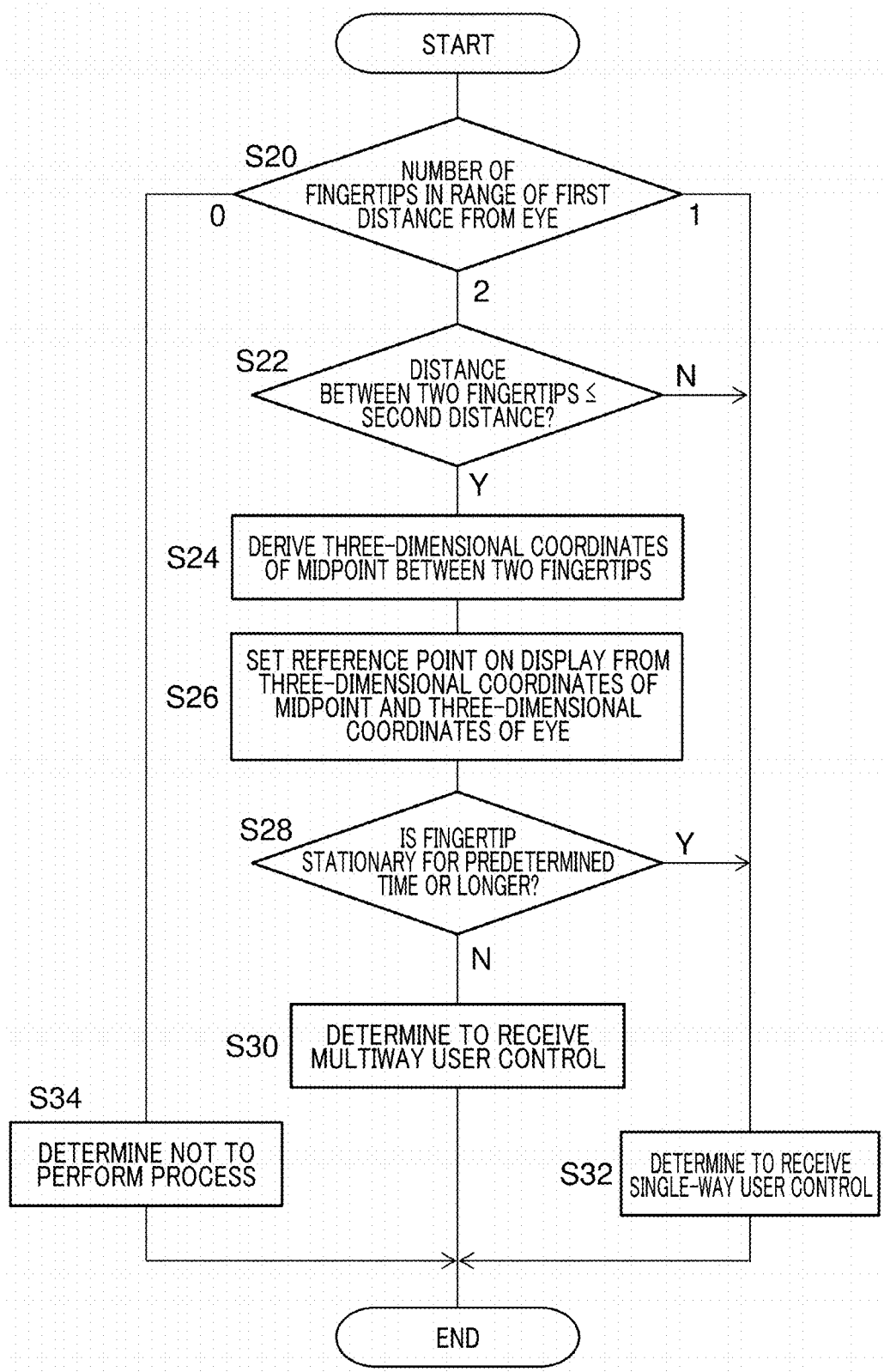
FIG. 9 is a flowchart showing the process in S14 of FIG. 8 for one user.

FIG. 9 is a flowchart showing the process in S14 of FIG. 8 for one user. When there are a plurality of users, the process of FIG. 9 is performed for each user in S14 of FIG. 8.

When the number of fingertips in the range of the first distance from the eye is "0" ("0" in S20), the determination unit 28 determines not to perform a process (S34) and ends the process. When the number of fingertips within the range of the first distance from the eye is "1" ("1" in S20), the determination unit 28 determines to receive a single-way user control (S32) and ends the process.

When the number of fingertips in the range of the first distance from the eye is "2" ("2" in S20) and the distance between the two fingertips is equal to or smaller than the second distance (Y in S22), the reference point setting unit 30 derives the three-dimensional coordinates of the midpoint between the two fingertips (S24) and sets the reference point on the display 14 from the three-dimensional coordinates of the midpoint and the three-dimensional coordinates of the eye (S26). When the fingertip does not remain stationary for a predetermined time or longer (N in S28), the determination unit 28 determines to receive a multiway user control (S30) and ends the process.

When the distance between the two fingertips is not equal to or smaller than the second distance in S22 (N in S22), control moves to S32. When the fingertip remains stationary for a predetermined time or longer in S28 (Y in S28), control moves to S32.

According to this embodiment, it is possible to reduce, enlarge, rotate, etc. an image with reference to the user's viewpoint on the image that results when the line of sight of the user passes through the midpoint of the two fingertips. Accordingly, it is ensured that the user does not experience a feeling of strangeness easily.

The present disclosure has been described above based on the embodiment. The embodiment is intended to be illustrative only and it will be understood by those skilled in the art that various modifications to combinations of constituting elements and processes are possible and that such modifications are also within the scope of the present disclosure.

A control apparatus according to an embodiment of the present disclosure includes:
 a reference point setting unit that receives spatial coordinates of each of a first part, a second part, and a third part of a body of a user located in front of a display, identifies a midpoint between the spatial coordinates of the first part and the spatial coordinates of the second part, and sets a point on the display intersecting a virtual straight line passing through the midpoint identified and the spatial coordinates of the third part as a reference point; and
 a function execution unit that performs a process, determined by a movement of the first part and the second part, on an image displayed on the display, with reference to the reference point set.

According to this embodiment, it is possible to perform the process on the image with reference to a position on the image close to the viewpoint that results when the line of sight of the user passes through the midpoint between the first part and the second part. Accordingly, it is ensured that the user does not experience a feeling of strangeness easily.

The first part may be a first fingertip of the user,
 the second part may be a second fingertip of the user, and
 the third part may be a part of a face of the user.

In this case, it is possible to control the image easily based on the movement of the two fingertips. Further, the third part is a part of the face of the user so that the position on the image even closer to the viewpoint that results when the line of sight of the user passes through the midpoint of the first part and the second part can be set as the reference point. Accordingly, it is ensured that the user does not experience a feeling of strangeness even less easily.

The third part may be an eye of the user.

In this case, the viewpoint on the image that results when the line of sight of the user passes through the midpoint of the first fingertip and the second fingertip can be set as the reference point. Accordingly, it is ensured that the user does not experience a feeling of strangeness even less easily.

The control apparatus may further include: an image reception unit that receives an image that captures one or more users and detects the third part of each user based on the image received, and
 the reference point setting unit may set the reference point when, for each of one or more third parts detected, the first part and the second part are located within a range of a first distance from the third part.

In this case, it is possible to set the reference point for each of one or more users that satisfies a condition.

The function execution unit may perform the process determined by a movement of the first part and the second part on the image with reference to the reference point when, for each of one or more third parts detected, the first part and the second part are located within the range of the first distance from the third prat, provided that a predetermined multiway user control condition is satisfied.

In this case, it is possible to perform the process on the image with reference to the reference point for each of one or more users that satisfies a condition. It is therefore possible to address user control of a plurality of users.

The function execution unit may perform at least one of a process determined by the movement of the first part or a process determined by the movement of the second part when, for each of one or more third parts detected, i) the first part and the second part are located within the range of the first distance from the third part but the multiway user control condition is not satisfied or ii) only one of the first part and the second part is located within the range of the first distance from the third part.

In this case, it is possible to perform at least one of the process determined by the movement of the first part or the process determined by the movement of the second part for each of one or more users that satisfies a condition. It is therefore possible to address various user control of a plurality of users.

The multiway user control condition may require that a distance between the first part and the second part is equal to or smaller than a second distance, and that the first part and the second part are not stationary for a predetermined time or longer.

In this case, it is easy for the user to satisfy the multiway user control condition.

The process executed by the function execution unit and determined by the movement of the first part and the second part may include:
  a process of reducing the image around the reference point in accordance with a pinch-in action of bringing the first part and the second part closer; and
  a process of enlarging the image around the reference point in accordance with a pinch-out action of moving the first part and the second part away.

In this case, it is possible to enlarge or reduce the image around the reference point in accordance with the movement of the first part and the second part.

The process executed by the function execution unit and determined by the movement of the first part and the second part may be a process of rotating the image around the reference point in accordance with a rotating action of rotating the first part and the second part around the midpoint.

In this case, it is possible to rotate the image around the reference point in accordance with the movement of the first part and the second part.

A control method according to an embodiment of the present disclosure includes:
  receiving spatial coordinates of each of a first part, a second part, and a third part of a body of a user located in front of a display;
  identifying a midpoint between the spatial coordinates of the first part and the spatial coordinates of the second part, and setting a point on the display intersecting a virtual straight line passing through the midpoint identified and the spatial coordinates of the third part as a reference point; and
  performing a process, determined by a movement of the first part and the second part, on an image displayed on the display, with reference to the reference point set.

According to this embodiment, it is ensured that the user does not experience a feeling of strangeness easily.

While various embodiments have been described herein above, it is to be appreciated that various changes in form and detail may be made without departing from the spirit and scope of the invention(s) presently or hereafter claimed.

What is claimed is:

1. A control apparatus comprising
  a memory that stores a program; and
  a processor coupled to the memory and configured to perform processing by executing the program, the processing including:
  receiving spatial coordinates of each of a first part, a second part, and a third part of a body of a user located in front of a display;
  identifying a midpoint between the spatial coordinates of the first part and the spatial coordinates of the second part;
  setting a point on the display intersecting a virtual straight line passing through the midpoint identified and the spatial coordinates of the third part as a reference point; and
  performing a process, determined by a movement of the first part and the second part, on an image displayed on the display, with reference to the reference point set.

2. The control apparatus according to claim 1,
  wherein the first part is a first fingertip of the user,
  wherein the second part is a second fingertip of the user, and
  wherein the third part is a part of a face of the user.

3. The control apparatus according to claim 2,
  wherein the third part is an eye of the user.

4. The control apparatus according to claim 1,
  wherein the processing further includes:
  receiving an image that captures one or more users and detecting the third part of each user based on the image received, and
  wherein the reference point is set when, for each of one or more third parts detected, the first part and the second part are located within a range of a first distance from the third part.

5. The control apparatus according to claim 4,
  wherein the process determined by a movement of the first part and the second part is performed on the image with reference to the reference point when, for each of one or more third parts detected, the first part and the second part are located within the range of the first distance from the third prat, provided that a predetermined multiway user control condition is satisfied.

6. The control apparatus according to claim 5,
  wherein the processing further includes:
  performing at least one of a process determined by the movement of the first part or a process determined by the movement of the second part when, for each of one or more third parts detected, i) the first part and the second part are located within the range of the first distance from the third part but the multiway user control condition is not satisfied or ii) only one of the first part and the second part is located within the range of the first distance from the third part.

7. The control apparatus according to claim 5,
  wherein the multiway user control condition requires that a distance between the first part and the second part is equal to or smaller than a second distance, and that the first part and the second part are not stationary for a predetermined time or longer.

8. The control apparatus according to claim 1,
  wherein the process determined by the movement of the first part and the second part includes:

a process of reducing the image around the reference point in accordance with a pinch-in action of bringing the first part and the second part closer; and a process of enlarging the image around the reference point in accordance with a pinch-out action of moving the first part and the second part away.

9. The control apparatus according to claim 1,
wherein the process determined by the movement of the first part and the second part is a process of rotating the image around the reference point in accordance with a rotating action of rotating the first part and the second part around the midpoint.

10. The control apparatus according to claim 4,
wherein the first distance has a value in a range 40 cm-60 cm.

11. The control apparatus according to claim 7,
wherein the second distance has a value in a range 40 cm-60 cm, and
wherein the predetermined time is several seconds.

12. The control apparatus according to claim 8,
wherein the process of reducing the image includes reducing the image by a degree determined by a distance of movement of the first part and the second part.

13. The control apparatus according to claim 8,
wherein the process of enlarging the image includes enlarging the image by a degree determined by a distance of movement of the first part and the second part.

14. The control apparatus according to claim 9,
wherein the process of rotating the image includes rotating the image by an angle determined by an angle of rotation of a virtual line connecting the first part and the second part.

15. The control apparatus according to claim 1,
wherein the processing further includes:
displaying an image indicating the reference point on the display.

16. The control apparatus according to claim 4,
wherein the processing further includes:
not performing the process on the image when, for each of one or more third parts detected, the first part and the second part are not located within the range of the first distance from the third part.

17. A control method comprising:
receiving spatial coordinates of each of a first part, a second part, and a third part of a body of a user located in front of a display;
identifying a midpoint between the spatial coordinates of the first part and the spatial coordinates of the second part, and setting a point on the display intersecting a virtual straight line passing through the midpoint identified and the spatial coordinates of the third part as a reference point; and
performing a process, determined by a movement of the first part and the second part, on an image displayed on the display, with reference to the reference point set.

* * * * *